US005770670A

United States Patent [19]

Vertommen et al.

[11] Patent Number: 5,770,670
[45] Date of Patent: Jun. 23, 1998

[54] ALLYL PEROXIDE CHAIN TRANSFER AGENTS

[75] Inventors: Luc Louis Theophile Vertommen, Westervoort; John Meijer, Deventer, both of Netherlands; Bernard Jean Maillard, Pessac, France

[73] Assignee: E.I. duPont de Nemours & Co., Wilmington, Del.

[21] Appl. No.: 847,217

[22] Filed: May 1, 1997

Related U.S. Application Data

[62] Division of Ser. No. 857,916, May 15, 1992, Pat. No. 5,708,104.

[30] Foreign Application Priority Data

Nov. 15, 1989 [EP] European Pat. Off. ............ 892028895

[51] Int. Cl.$^6$ ............................ C08F 20/18; C08F 18/04; C08F 36/04; C08F 20/44; C08F 12/08; C08F 210/00; C08F 4/36

[52] U.S. Cl. ........................... 526/328; 526/319; 526/335; 526/341; 526/346; 526/348; 526/227

[58] Field of Search .................................. 526/329.7, 328, 526/319, 335, 341, 346, 348, 227

*Primary Examiner*—Joseph L. Schofer
*Assistant Examiner*—Wu C. Cheng
*Attorney, Agent, or Firm*—Bacon & Thomas

[57] ABSTRACT

Novel unsaturated peroxides useful as molecular weight regulators in polymerization reactions are disclosed. Also disclosed are a polymerization process employing these novel unsaturated peroxides as molecular weight regulators, polymers and oligomers made by this process and articles of manufacture comprising one or more polymers or oligomers made by this process. These molecular weight regulating peroxides provide the ability to introduce an epoxy functionality to the oligomer or polymer as well as an additional functionality. Further, omega (di) substituted or alpha, omega disubstituted polymers may be synthesized using the unsaturated peroxides of the present invention.

6 Claims, No Drawings

ALLYL PEROXIDE CHAIN TRANSFER AGENTS

The present application is a divisional application of Ser. No. 08/857,916, filed on May 15, 1992, now U.S. Pat. No. 5,708,104.

The invention relates to novel allyl peroxide chain transfer agents, methods of radically polymerizing monomers in the presence of said peroxides to thereby control the molecular weights of the resulting polymers and to polymers and shaped objects containing polymers produced by the instant polymerization methods.

The general concept of employing a molecular weight regulating agent, also known as a chain transfer agent, as an additive during polymerization reactions has been known for a long time. A number of different chain transfer agents having an olefinic group therein, have been employed for this purpose.

Perhaps one of the earlier disclosures of such a polymerization modifying material can be found in U.S. Pat. No. 3,248,374 published on 24 Jun. 1966, wherein the use of an olefin of the formula I as a polymerization modifier is disclosed.

wherein R is hydrogen, halogen or a saturated aliphatic radical and X is halogen, cyanide, phenyl, carboxyl, carbonate, phenyloxy, —CONH$_2$, —CONH-alkyl or —CON-dialkyl. The presence of these olefinic materials during the polymerization of vinylidene chloride with other olefinic materials rendered the resultant polymer more water soluble.

U.S. Pat. No. 3,726,832 published on 10 Apr. 1973, discloses the use of a cyclic ether or a vinyl ether as a molecular weight regulator for the polymerization of dienes.

U.S. Pat. No. 4,176,219 published on 27 Nov. 1979, discloses the use of allyl halides, benzyl halides or a tertiary aliphatic halide compound as molecular weight regulators for the production of 1,2-polybutadiene.

U.S. Pat. No. 4,405,742, published on 20 Sep. 1983, discloses the use as a regulator, of unsaturated ethers, thioethers, amines, and acrylates and thioacrylates of acrylamides for the purpose of polymerizing chloroprene to produce an improved polychloroprene product.

Finally, PCT patent application WO 88/04304 published on 16 Jun. 1988 discloses the use of compounds of the formula (II) for the purpose of controlling the molecular weight and end group functionality of polymers.

wherein $R_1$ is hydrogen or a group capable of activating the vinylic carbon towards free radical addition; Y is $OR_2$ or $CH_2X(R_2)_n$, where $R_2$ is an optionally substituted alkyl, optionally substituted alkenyl, optionally substituted alkynyl, or optionally substituted saturated or unsaturated carbocyclic or heterocyclic ring; X is an element other than carbon selected from Groups IV, V, VI or VII of the Periodic Table or a group consisting of an element selected from Groups IV, V or VI to which is attached one or more oxygen atoms; and n is a number from 0 to 3 such that the valency of X is satisfied and, when n is greater than 1, the groups represented by $R_2$ may be identical or different.

When this broad formula is literally interpreted and Y is selected to be $CH_2XR_2$ and X is selected to be an element from Group VI to which is attached one or more oxygen atoms and that element from Group VI is oxygen, one obtains, as one of a multitude of possibilites, an unsaturated peroxide. However, the application text itself makes no reference to the possibility that compounds of the formula II can, in fact, be peroxides and no examples employing peroxides of the formula II are included in the text of the application. Further, oxygen is not included in the more specific list of suitable elements for X and peroxides are not included in the list of suitable oxygen containing groups represented by X. Finally, on-page 5 it is disclosed that when compounds of the formula II wherein Y is $CH_2XR_2$ are employed as chain transfer agents, a polymer or oligomer is produced which contains a polymerizable olefinic group at one end thereof. This last statement clearly excludes peroxides from being considered by one of ordinary skill in the art because, as will be later discussed herein, the use of such an unsaturated peroxide would not produce the required polymerizable olefinic group at one end of the polymer or oligomer. Accordingly, although the broad formula of the above-identified patent application literally encompasses unsaturated peroxides, one of ordinary skill in the art would not consider such materials within the scope of this broad formula.

The present invention relates to organic peroxides useful as chain transfer agents in radical polymerization of monomers characterized in that said organic peroxides are represented by the following formula:

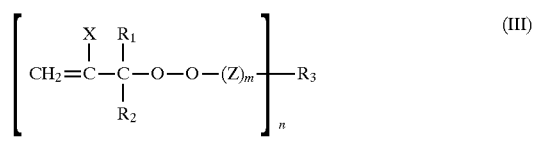

wherein n is an integer from 1–4, $R_1$ and $R_2$ may be the same or different and are selected from hydrogen or lower alkyl, $R_3$ is part of a leaving group, $R_3$ having a valency of n, X is an activating group capable of enhancing the reactivity of the olefinic group towards free radical addition, m is 0 or 1 and Z is selected from

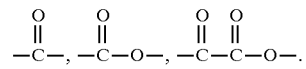

The present invention also relates to a polymerization process employing the organic peroxides of the formula III as chain transfer agents, polymers produced by this polymerization process and shaped objects comprising one or more of such polymers.

Similar peroxides are known from EP 0 322 945 and EP 0 273 990 for use as polymer modification agents. In the processes of these patent applications, however, the unsaturated peroxides are contacted directly with the preformed polymer to thereby introduce functional groups onto the polymer. In addition, these peroxides are significantly different from the present peroxides since they do not include an activating group X adjacent the olefinic group.

Tertiary alkenyl peroxy esters are disclosed for use as initiators and curing agents in EP 0 219 900. However, there is no mention of using these materials as chain transfer agents or even of any chain transfer activity. Further, these compounds differ from those of the present invention since they are all esters.

Finally, "Deplacements Homolytiques Intramoleculaires," *Tetrahedron,* Vol. 41, No. 21, pp.

5039–5043, (1985) discloses the use of unsaturated peroxides for 2,3-epoxypropanating several low molecular weight compounds. The unsaturated peroxides described in this patent again differ from those of the present invention since they do not contain an activating group X adjacent the olefinic group. Further, the epoxypropanation of low molecular weight materials bears little, if any, relation to the application of a material as a chain transfer agent.

The peroxides of the invention correspond to the above-described formula III. They may be prepared in the usual manner for similar peroxides. In preparing the peroxides of the present invention use may be made of an alkenyl derivative of the general formula:

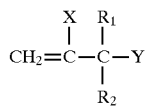
(IV)

or

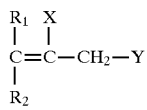
(V)

wherein X is an activating group capable of enhancing the reactivity of the olefinic group towards free radical addition, $R_1$ and $R_2$ may be the same or different and are selected from hydrogen or lower alkyl, and Y is Cl, Br, $OSO_2R$, OH, OOH

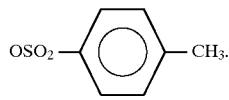

or a different leaving group.

As examples of suitable starting compounds may be mentioned:
2-ethoxy carbonyl-2-propenyl bromide,
2-phenyl-2-propenyl bromide,
2-ethoxy carbonyl-2-propenyl chloride,
2-phenyl-2-propenyl chloride,
2-phenyloxy carbonyl-2-propenyl bromide,
2-carboxy-2-propenyl chloride,
2-acetyloxy-2-propenyl bromide, 2-N,N-dimethylcarbonyl-2-butenyl bromide, 2-cyano-2-propenyl bromide, and 2-ethoxycarbonyl-2-butenyl chloride.

In the preparation of the present peroxides, an alkenyl halide IV or V can be reacted in the usual way, in an alkaline medium, with a hydroperoxide in the presence of a phase transfer catalyst.

As examples of suitable hydroperoxides for use in the preparation of the unsaturated peroxides of the present invention may be mentioned:
1,1-dimethyl-2-propenyl hydroperoxide,
1-methyl-1-ethyl-2-propenyl hydroperoxide,
1,1-diethyl-2-propenyl hydroperoxide,
1-methyl-1-isopropyl-2-propenyl hydroperoxide,
1,1-diisopropyl-2-propenyl hydroperoxide,
t-butyl hydroperoxide,
1,1-dimethyl butyl hydroperoxide,
1,1,3,3,-tetramethyl butyl hydroperoxide,
1,1-dimethyl-3-hydroxybutyl hydroperoxide,
t-pentyl hydroperoxide,
1-ethenyl-1-hydroperoxycyclohexane,
1-(1-hydroperoxy-1-methyl ethyl)-4-methyl cyclohexane,
1-(1-hydroperoxy-1-methyl ethyl)-4-(1-hydroxy-1-methyl ethyl)benzene,
4-isopropylcumyl hydroperoxide,
(1-hydroperoxy-1-methyl ethyl)benzene,
α-cumyl hydroperoxide,
1,3-di(1-hydroperoxy-1-methyl-1-ethyl) benzene,
1,4-di(1-hydroperoxy-1-methyl-1-ethyl) benzene,
1,3,5-tri(1-hydroperoxy-1-methyl-1-ethyl) benzene,
2,5-dimethyl-2,5-dihydroperoxyhexane, and
2,5-dimethyl-2,5-dihydroperoxy-3-hexyne.

Another useful method for the preparation of the peroxides of the present invention is to first prepare an unsaturated hydroperoxide and then react the unsaturated hydroperoxide with an additional material to thereby introduce the group $R_3$ thereto.

Examples of these preparation methods are illustrated by the preparations of:

1,1-dimethyl-2-phenyl-2-propenyl-peroxy-2,3-epoxy propane from 1,1-dimethyl-2-phenyl-2-propenyl hydroperoxide and epichlorohydrin under alkaline conditions, 1,1-dimethyl-2-ethoxycarbonyl-2-propenyl-peroxy.-3-carboxypropionate from 1,1-dimethyl-2-ethoxycarbonyl-2-propenyl hydroperoxide and succinic anhydride in pyridine, 1-methyl-2-ethoxycarbonyl-2-propenylperoxy ethyl carbonate from 1-methyl-2-ethoxycarbonyl-2-propenyl hydroperoxide and ethylchloroformate in pyridine, 1-methyl-2-ethoxycarbonyl-2-propenyl-trimethylsilyl peroxide from 1-methyl-2-ethoxycarbonyl-2-propenyl hydroperoxide and trimethylchlorosilane in pyridine, 1-ethyl-1-methyl-1-(1,1-dimethyl-2-ethoxycarbonyl-2-propenyl peroxy) benzene from 1,1-dimethyl-2-ethoxycarbonyl-2-propenylhydroxide and phenylisopropanol using an acid catalyst;

2-methoxy- -(1-methyl-2-ethoxycarbonyl-2-propenyl peroxy) propane from 1-methyl-2-ethoxycarbonyl-2-propenyl hydroperoxide and 2-methoxy-1-propene using an acid catalyst.

The organic peroxides of the present invention are generally represented by the following formula:

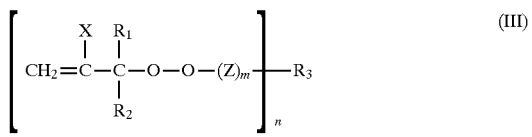
(III)

wherein n is an integer from 1–4, $R_1$ and $R_2$ may be the same or different and are selected from hydrogen or lower alkyl, or $R_1$ and $R_2$ may combine to form a $C_5$–$C_7$ aliphatic ring, $R_3$ is part of a leaving group (for example, if m=0, the leaving group is $OR_3$), $R_3$ having a valency of n, X is an activating group capable of enhancing the reactivity of the olefinic group towards free radical addition, and together with $R_1$, may combine to form an aliphatic ring, m is 0 or 1 and Z is selected from

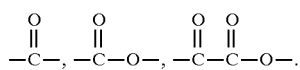

More particularly, $R_3$ is selected from the group consisting of an alkyl group having 4–18 carbon atoms; an alkenyl group having 5–18 carbon atoms or 1-vinylcyclohexyl, all of which may be optionally substituted with one or more of hydroxyl, amino, epoxy or carboxy groups; p-menth-8-yl; a group of the general formula:

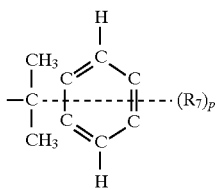

wherein p=0, 1 or 2 and R7 is an isopropenyl group, a 2-hydroxyisopropyl group, or an isopropyl group; or an group of the formula:

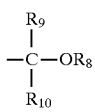

wherein $R_8$, $R_9$ and $R_{10}$ are independently selected from alkyl, alkenyl and aryl groups all of which may be optionally substituted with one or more of hydroxyl, amino, epoxy and carboxy groups; hydrogen, or any two of $R_8$, $R_9$ and $R_{10}$ may combine to form a ring;

when n=2, $R_3$=an alkylene group having 8–12 carbon atoms, an alkynylene group having 8–12 carbon atoms, or a group of the general formula:

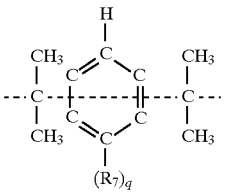

wherein q=0 or 1 and $R_7$ has the above-indicated meaning; and when n=3, $R_3$=1,2,4-triisopropylbenzene-α,α',α''-triyl or 1,3,5-triisopropylbenzene-α,α',α''-triyl; and for n=1–4, $R_3$ can be a silicon-containing group.

Particular examples of useful $R_3$ groups include:

t-butyl, t-amyl, t-pentyl, t-pentenyl, t-hexyl, t-heptyl,

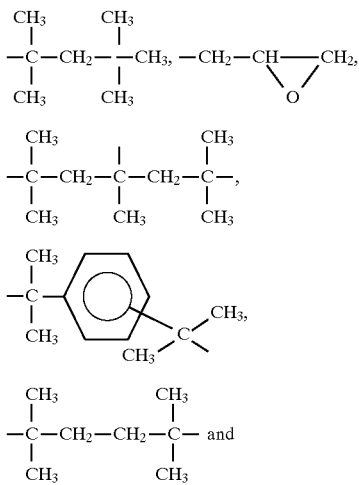

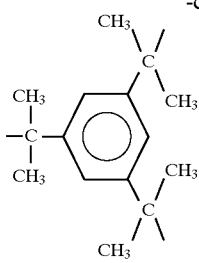

X is an activating group capable of enhancing the reactivity of the olefinic unsaturation towards free radical addition. Preferably, X is a group selected from the group consisting of ester, acid, carbonyl, alkoxy carbonyl, alkoxy, phenyl, substituted aromatic, aryloxycarbonyl, carboxy, acyloxy, aryloxy, epoxy, carbamoyl, halogens, halocarbons,

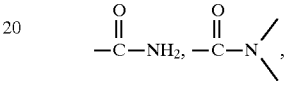

carbonates, sulfones, sulfoxides, phosphonates, phosphine oxides, and cyano or a group including two or more of these functionalities which may be the same or different. X may also combine with $R_1$ to form a $C_5$–$C_7$ aliphatic ring. In a preferred embodiment X is an electron-withdrawing group optionally having one or more functionalities such as hydroxy, carboxy, epoxy and amino.

The group X may be selected on the basis of its effect on the chain transfer coefficient of the peroxide. More particularly, the ideal chain transfer coefficient is about one. Thus, for a particular peroxide, X can be selected to control the reactivity of the chain transfer agent such that the chain transfer coefficient is as close to one as possible. In this manner, the monomeric starting materials can be added in the ratio in which they are desired in the polymeric products.

As typical examples of the unsaturated peroxides which are useful as chain transfer agents according to the present invention, the following compounds may be mentioned:

2-methyl-2-(2-phenyl-2-propenyl peroxy) propane,
2-methyl-2-(2-ethoxycarbonyl-2-propenyl peroxy) propane,
2-methyl-2-(1-methyl-2-ethoxycarbonyl-2-propenyl peroxy) propane,
2-methyl-2-(1,1-dimethyl-2-ethoxycarbonyl-2-propenyl peroxy) butane,
2,4-dimethyl-2,4-di(1,1-dimethyl-2-phenyl-2-propenyl peroxy) pentane,
2-methyl-2-(1,1-dimethyl-2-carbamoyl-2-propenyl peroxy) hexane,
2,4,6-trimethyl-2,4,6-tri(1,1-dimethyl-2-cyano-2-propenyl peroxy) heptane,
2-methyl-2-[2-(2-hydroxy ethoxy carbonyl)-2-propenyl peroxy] propane,
2-methyl-2-(1-methyl -2-phenyloxy-2-propenyl peroxy) propane,
2-methyl-2-(1,1-dimethyl-2-phenyl-2-propenyl peroxy) propane,
1,2-epoxy-3-(1,1-dimethyl-2-phenyl-2-propenyl peroxy) propane,
1,2-epoxy-3-(1,1-dimethyl-2-ethoxycarbonyl-2-propenyl peroxy) propane
1-methyl-2-ethoxycarbonyl-2-propenyl trimethylsilyl peroxide,
1-ethyl-1-methyl-1-(1,1-dimethyl-2-ethoxy carbonyl-2-propenylperoxy) benzene, 2-methoxy-2-(1-methyl-2-ethoxycarbonyl-2-propenyl peroxy) propane, 1,1-dimethyl-2-ethoxycarbonyl-2-propenylperoxy-3-carboxy propionate, and 1-methyl-2-ethoxy carbonyl-2-propenyl peroxy ethyl carbonate.

The peroxides can be prepared, transported, stored and applied as such or in the form of powders, granules, solutions, aqueous suspensions, emulsions, pastes or any other known method. Which of these physical forms is preferred will depend on the particular polymerization system being employed. Also, considerations of safety (desensitization) may play a role. Desensitizing agents may, in fact, be used with the peroxides of the present invention and particularly suitable desensitizing agents include solid carrier materials such as silica, chalk and clay, inert plasticizers or solvents such as mono-or dichloro benzene, and of course water.

The process of the present invention employs compounds of the formula III as alternatives to known chain transfer agents for the control of molecular weight. The process of the present invention may be operated in the same manner as processes employing conventional chain transfer agents such as thiols. For example, the present process can be used in the manufacture of synthetic rubbers and other polymer formulations, where reduced molecular weight aids polymer processing and improves the polymer properties. The process is also applicable to the production of low molecular weight polymers and oligomers for a variety of applications such as for use in paints or coatings.

The chain transfer agents of the present invention offer several advantages. First, these materials exhibit an unexpectedly good ability to control molecular weights in polymerization processes. Thus, polymers of various molecular weights, with accurate control of the $M_n$, can be obtained. In its simplest form, molecular weight can be regulated simply by varying the amount of peroxide chain transfer agent added to the system.

Secondly, the method of the present invention is extremely versatile as is evidenced by the variety of polymerizations in which molecular weight regulation has been successful.

Thirdly, as a result of the process of the present invention, each polymer chain may be terminated by at least a bifunctional end group. This is the result of the rearrangement of the peroxide functionality to form an epoxy functionality, in combination with the carrying over of the group X from the unsaturated peroxide initiator into the end group of the formed polymer or oligomer. It is also possible to form telechelic polymers by the present process. For instance, by using a leaving group carrying a functionality. The process of the present invention is extremely useful in producing omega substituted polymers, as well as alpha, omega disubstituted polymers. These polymers and oligomers produced by the process of the present invention may be grafted onto other polymers or reacted with other monomers, polymers or oligomers to form block copolymers or a graft copolymers. Such copolymers have many known uses. The polymers/oligomers produced can also be involved in crosslinking reactions.

In addition, the functional end groups on the polymers or oligomers made by the process of the present invention may be changed to other functional groups by known reaction processes. For example, the epoxy functionality may simply be converted to a hydroxy functionality using known methods.

In the present process, one simply carries out the normal polymerization process in the presence of one or more compounds of the formula III to thereby regulate the molecular weight of the polymer and provide functional end groups on the polymer. The reaction is generally carried out under normal polymerization conditions for the monomer being polymerized.

As an initiator may be used conventional polymerization initiators known in the art. The most preferred initiator will often depend upon the particular monomer which will be polymerized. In the case of styrene or methyl methacrylate polymerizations, the initiator of choice is azobisisobutyronitrile (AIBN). Generally, the amount of initiator used will be determined by known data for the particular polymerization process and will be independent of the type and amount of the chain transfer agent to be employed.

The chain transfer agent itself may be employed in various amounts depending primarily upon the monomer being polymerized, the chain transfer coefficient of the chain transfer agent and the desired molecular weight range to be obtained. As little as 0.001 mole percent of chain transfer agent based on the monomer can be used and up to 30.0 mole percent may also be employed. In general, from 0.1 to 15 mole percent of the chain transfer agent will produce the desired result. Of course, mixtures of different chain transfer agents may also be employed.

It is preferred to select a chain transfer agent which has a decomposition temperature above the polymerization temperature since decomposition of the chain transfer agent will prevent it from acting to regulate molecular weight. However, this need not always be the case. For example, in some instances it may be desirable for the unsaturated peroxide to act as both a chain transfer agent and an initiator, in which case some decomposition of the peroxide will be desirable.

The present invention also relates to the polymers and oligomers which are formed by the process of the invention. In this respect, it has been verified by spectral analyses that these materials include an epoxy functionality as well as the group X. Accordingly, these oligomers and polymers are special because of the many synthetic possibilities offered by the presence of an epoxy group as well as the group X.

Finally, the present invention also includes articles of manufacture which comprise one or more polymers or oligomers made by the process of the present invention. These articles of manufacture are useful in the coating industry, as lubricants, processing aids and interfacial agents for polymers, among other uses.

The following examples are presented to further illustrate the present invention.

EXAMPLE 1

Preparation of 2-methyl-2-(2-carboxyethyl-2-propenylperoxy) propane (ETBPMP)

To a stirred mixture of 125 ml demi-water, 0.65 mole t-butylhydroperoxide (70% w/w), 0.65 mole NaOH solution (50% w/w), 0.02 mole tetrabutylammonium bromide (99% w/w) and 60 ml petroleumether 60/80 was added 0.4 mole

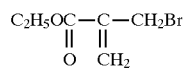

(95%) over a period of 45 minutes at a temperature 20° C. Stirring was continued for another 60 minutes at 15°–20° C. Thereafter the organic layer was separated and subsequently washed twice with 150 ml NaOH solution (10% w/w) with, 150 ml demiwater 4 times, and with 150 ml NaHCO$_3$ solution (5% w/w). After drying the organic layer with a mixture of 5 g MgSO$_4$.2H$_2$O and 0.5 g NaHCO$_3$, filtration, and addition of 9 mg of 4-methoxyphenol, the solvent is removed under reduced pressure 5 mbar at 20° C. A colourless liquid (44.5 g) was obtained having a peroxide content of 84.1% determined by GLC, corresponding to a yield of 46.3%. The structure was confirmed by IR and NMR spectroscopy. The 0.1 hour half-life temperature of the peroxide is given in table 1.

EXAMPLE 2

Preparation of 2-methyl-2-(2-phenyl-2-propenylperoxy)propane (TBPPP)

To a stirred mixture of 75 ml demi-water, 150 ml methylenechloride, 0.15 mole

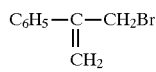

(95% w/w) and 0.02 mole tetrabutyl ammonium bromide (99% w/w) was added 0.30 mole KOH solution (45% w/w) over a 5 period of 60 minutes at a temperature 15°–20° C. Stirring was continued for an additional period of 16 hrs at 20° C. Thereafter the organic layer was separated and subsequently washed with 150 ml NaOH solution (10% w/w) 3 times, and 150 ml demi-water 3 times. After drying the organic layer with a mixture of 2.5 g MgSO$_4$.2H$_2$O and 0.25 g NaHCO$_3$, filtration, and addition of 7.5 mg of 4-methoxy phenol, the solvent is removed under reduced pressure 2 mbar at 20° C. A colourless liquid (26.1 g) was obtained having a peroxide content of 89.7% determined by GLC, corresponding to a yield of 75.7%. The structure of the peroxide was confirmed by IR and NMR spectroscopy. The 0.1, 1.0 and 10 hour half-life temperatures for this peroxide are given in table 1.

COMPARATIVE EXAMPLE 3

Preparation of t-pentenylperoxyde-2,3-epoxy propane (TPPEP)

To a stirred mixture of 28 ml demi-water and 0.25 mole t-pentenylhydroperoxide (76% w/w) was added 0.25 mole KOH solution (45% w/w) in 15 minutes at 20° C. To the obtained reaction mixture was added 0.25 mole epichlorohydrin (99% w/w) in 30 minutes at 20° C. Thereafter the temperature was raised to 30° C. and stirring was continued for an additional period of 6 hours at 30° C. The organic layer was separated and subsequently washed with 25 ml KOH solution (10% w/w) 2 times. After drying the organic layer with 3.5 g Na$_2$SO$_4$ and filtration, a colourless liquid (30.4 g) was obtained having a peroxide content of about 80% as determined by NMR spectroscopy corresponding to a yield of 62.4%. Before the polymerization experiment, peroxide (3) was purified by column chromatography to a purity of 95%. The structure of peroxide 3 was confirmed by NMR and IR-spectroscopy. The half-life temperatures for this peroxide are given in table 1.

TABLE 1

| Peroxide | Half-Life Temperatures (°C.) | | |
|---|---|---|---|
| Example | 10 hrs | 1 hr | 0.1 hr |
| 1 | — | — | 145 ± 2* |
| 2 | 97.0 | 120.1 | 146.2 |
| 3 | 105.2 | 123.9 | 144.5 |

*Estimated, not first order decomposition

EXAMPLE 4

Polymerization of methyl methacrylate in the presence of 2-methyl-2-(2-carboxyethyl-2-propenylperoxy) propane (ETBPMP)

To a 1.2 molar solution of methyl methacrylate in o-dichlorobenzene was added 0:5 mol % of AIBN and varying amounts of ETBPMP as a chain transfer regulator. The polymerization was carried out at a temperature of 80° C. over a period of 60 minutes. The results are shown in Table 2. In addition, Table 2 also includes a control polymerization wherein no chain transfer regulating agent was employed but otherwise all conditions remained the same. Thus, the effect of the chain transfer regulator on the molecular weight of the formed polymer is clearly demonstrated. Calculation of the chain transfer coefficient for ETBPMP for methyl methacrylate polymerization yielded a value of 0.42.

EXAMPLE 5

Polymerization of styrene in the presence of ETBPMP

To a 1.2 molar solution of styrene in o-dichlorobenzene was added 0.5 mol % of AIBN and varying amounts of ETBPMP as a chain transfer regulator. The polymerization was carried out at a temperature of 80° C. over a period of 60 minutes. The results are shown in Table 2 and include a control polymerization wherein no chain transfer agent was employed. The chain transfer coefficient of ETBPMP for styrene polymerization is 1.30.

The polymeric products from Examples 5 and 6 were subjected to spectral analysis and it was determined that these polymers contained terminal end groups which are glycidates of the following formula:

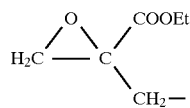

This confirms the formation of an epoxy group from the initial peroxy functionality as well as the carrying of the group X (COOEt) over to the final polymer.

TABLE 2

| [ETBPMP]/ [MONO-MER] | Mn (zorbax) | Methyl Methacrylate | | Mn (P32 500Å) | Styrene | |
|---|---|---|---|---|---|---|
| | | Conversion % MMA | ETBPMP | | Conversion % Styr. | ETBPMP |
| 0 | 23523 | 55.3 | — | 8686 | 12.4 | — |
| 0.01 | 10180 | 41.0 | 26.1 | 2536 | 11.8 | 29.3 |
| 0.02 | 6826 | 35.8 | 22.0 | 1692 | 10.6 | 27.9 |
| 0.04 | 4336 | 27.7 | 19.4 | 1161 | 16.5 | 32.8 |
| 0.07 | 3294 | 25.1 | 19.2 | 840 | 10.3 | 26.6 |
| 0.1 | 2416 | 19.0 | 19.6 | 705 | 10.7 | 26.5 |

EXAMPLE 6

Polymerization of methyl methacrylate in the presence of 2-methyl-2-(2-phenyl-2-propenylperoxy) propane (TBPPP)

To a 1.2 molar solution of methyl methacrylate in o-dichlorobenzene was added 0.5 mol % of AIBN and varying amounts of TBPPP as a chain transfer regulator. The polymerization was carried out at a temperature of 80° C. over a period of 60 minutes. The results are shown in Table 3 and include a control polymerization wherein no chain transfer agent was employed. The chain transfer coefficient of TBPPP or methyl methacrylate polymerization is 0.51.

EXAMPLE 7

Polymerization of styrene in the presence of TBPPP

To a 1.2 molar solution of styrene in o-dichlorobenzene was added 0.5 mol % of AIBN and varying amounts of TBPPP as a chain transfer regulator. The polymerization was carried out at a temperature of 80° C. over a period of 60 minutes. The results are shown in Table 3 and include a control polymerization wherein no chain transfer agent was employed. The chain transfer coefficient of TBPPP for styrene polymerization is 0.46.

The products of Examples 6 and 7 were characterized by spectroscopic analyses and it was determined that these polymers contained terminal end groups which are phenyl epoxides of the following formula:

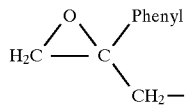

This confirms the formation of the epoxy functionality from the initial peroxy functionality as well as confirming that the group X (Phenyl) is carried over into the polymer or oligomer.

TABLE 3

| [TBPPP]/ [MONOMER] | Methyl Methacrylate | | Styrene | |
|---|---|---|---|---|
| | Mn (P34, 500Å) | Conversion % MMA | Mn (P32, 500Å) | Conversion % Styr. |
| 0 | 21306 | 52.7 | 9624 | 12.4 |

TABLE 3-continued

| [TBPPP]/ [MONOMER] | Methyl Methacrylate | | Styrene | |
|---|---|---|---|---|
| | Mn (P34, 500Å) | Conversion % MMA | Mn (P32, 500Å) | Conversion % Styr. |
| 0.01 | 6960 | 47.4 | 5277 | 11.0 |
| 0.02 | 4338 | 39.9 | 4103 | 10.0 |
| 0.04 | 2724 | 29.6 | 2844 | 9.8 |
| 0.07 | 1930 | 20.0 | 1964 | 8.8 |
| 0.1 | 1572 | 15.2 | 1600 | 5.8 |

COMPARATIVE EXAMPLE 8

Polymerization of methyl methacrylate in the presence of t-pentenylperoxy-2,3-epoxy propane (TPPEP)

To a 1.25 molar solution of methyl methacrylate in o-dichlorobenzene were added 0.5 mol % of AIBN and varying amounts of TPPEP. The polymerization was carried out at 80° C. over a period of 60 minutes. The polymerization results are shown in Table 4. The chain transfer coefficient of TPPEP for methyl methacrylate polymerization was 0.0055.

COMPARATIVE EXAMPLE 9

Polymerization of styrene in the presence of TPPEP

To a 1.25 molar solution of styrene in o-dichlorobenzene were added 0.5 mol % of AIBN and varying amounts of TPPEP. The polymerization was carried out at 80° C. over a period of 60 minutes. The polymerization results are shown in Table 4. The chain transfer coefficient of TPPEP for styrene polymerization was 0.0047.

TABLE 4

Mn's and monomer conversions for MMA and styrene polymerisations in the presence of TPPEP

| MONOMER | [TPPEP]/ [MONOMER] | Mn | MONOMER CONVERSION (%) |
|---|---|---|---|
| MMA | 0.0 | 19005 | 55.8 |
| | 0.1 | 17290 | 54.8 |
| | 0.2 | 15955 | 54.8 |
| | 0.4 | 13402 | 53.2 |
| | 0.7 | 10934 | 53.1 |
| | 1.0 | 9268 | 49.3 |
| styrene | 0.0 | 9061 | 17.1 |
| | 0.1 | 8712 | 17.0 |
| | 0.2 | 8328 | 17.0 |
| | 0.4 | 7642 | 17.1 |
| | 0.7 | 7068 | 18.7 |
| | 1.0 | 6412 | 18.3 |

EXAMPLE 10

Polymerization of Butyl Acrylate in the Presence of TBPPP and ETBPMP. A 0.70 moles/liter solution of butyl acrylate in 100 ml t-butyl acetate was prepared together with 0.12 mol/l of the peroxides. The reaction mixture was transferred into an open reaction flask and the oxygen removed by letting argon flow through above the reaction solution. The flask was then placed in an oil bath at 80° C. and the polymerization reaction begun by adding 0.05 mol/l of AIBN initiator.

After 2 hours, half again the amount of initiator was added to the solution. The reaction was continued for an additional 2 hours and then the mixture was cooled to room temperature.

The chain transfer coefficients were 1.34 for ETBPMP and 2.66 for TBPPP. The molecular weights and polymer conversions are given in table 5.

TABLE 5

| Peroxide | [Peroxide]/[Monomer] | Mn | Conversion % Monomer | Conversion % Peroxide |
|---|---|---|---|---|
| TBPPP | 0.0000 | 21660 | 40.4 | — |
|  | 0.0201 | 2440 | 15.8 | 71.3 |
|  | 0.0398 | 1401 | 6.9 | 46.4 |
|  | 0.0801 | 584 | 0.0 | 8.5 |
|  | 0.1606 | 577 | 0.0 | 5.2 |
|  | 0.2008 | 547 | 0.0 | 2.2 |
| ETBPMP | 0.0000 | 21050 | 41.4 | — |
|  | 0.0208 | 3335 | 18.7 | 72.1 |
|  | 0.0408 | 2112 | 14.5 | 54.4 |
|  | 0.1227 | 1114 | 9.4 | 22.6 |
|  | 0.1632 | 978 | 7.9 | 18.2 |
|  | 0.2040 | 880 | 6.8 | 14.9 |

The foregoing examples have been presented for the purpose of illustration and description only and are not to be construed as limiting the scope of the invention in any way. The scope of the invention is to be determined by the claims appended hereto.

We claim:

1. A copolymer produced by radically copolymerizing monomers in the presence of an effective amount of one or more peroxides represented by the following formula:

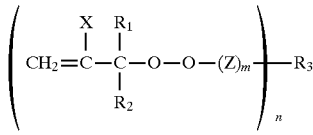

wherein n is an integer from 2–4, $R_1$ and $R_2$ may be the same or different and are selected from the group consisting of hydrogen and lower alkyl or $R_1$ and $R_2$ may combine to form a $C_5$–$C_7$ aliphatic ring, $R_3$ has a valency of n and when n=2, $R_3$ is an alkylene group having 8–12 carbon atoms, an alkynylene group having 8–12 carbon atoms or a group of the general formula:

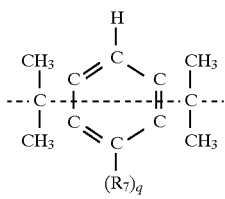

wherein q=0 or 1, and $R_7$ is an isopropenyl group, a 2-hydroxyisopropyl group, and an isopropyl group:

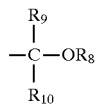

wherein $R_8$, $R_9$ and $R_{10}$ are independently selected from the group consisting of alkyl, alkenyl and aryl groups all of which may be optionally substituted with one or more of hydroxyl, amino, epoxy and carboxy groups, hydrogen, or two of $R_8$, $R_9$ and $R_{10}$ may combine to form a ring; or the group —COOR$^6$ where R$^6$ is hydrogen or an optionally substituted alkyl, alkenyl or aryl group; and when n=3, $R_3$=1,2,4-triisopropylbenzene-α,α',α"-triyl; and for n=2–4, $R_3$ can be a silicon-containing group and X is an electron withdrawing group and together with $R_1$, may combine to form a $C_5$–$C_7$ aliphatic ring, m is 0 or 1 and Z is selected from the group consisting of

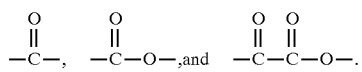

2. The copolymer of claim 1, wherein from 0.001 to 30.0 mole percent of said peroxide, based on the moles of polymerizable monomer, is employed as the effective amount.

3. The copolymer of claim 1 wherein said polymerizable monomer is selected from the group consisting of acrylates, methacrylates, styrene, styrene derivatives, vinyl esters, dienes, acrylonitrile and α-olefins.

4. The copolymer of claim 1 wherein $R_3$ of the peroxides is selected from the group consisting of an alkyl group containing 4–18 carbon atoms; an alkenyl group having 5–18 carbon atoms or 1-vinylcyclohexyl, all of which may be optionally substituted with one or more of hydroxyl, amino, epoxy, and carboxy groups; p-menth-8-yl; and group of formula

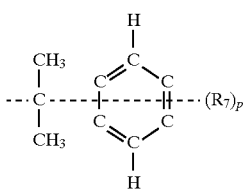

wherein:

p is 0, 1 or 2; and $R_7$ is an isopropenyl group, a 2-hydroxyisopropyl group, or an isopropyl group of formula:

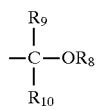

wherein:

$R_8$, $R_9$ and $R_{10}$ are independently selected from the group consisting of alkyl, alkenyl and aryl groups, all of which may be optionally substituted with one or more of hydroxyl, amino, epoxy and carboxy groups, hydrogen, or two of $R_8$, $R_9$ and $R_{10}$ may combine to form a ring;

and when n is 2, $R_3$ is an alkylene group having 8–12 carbon atoms, an alkynylene group having 8–12 carbon atoms, or a group of formula

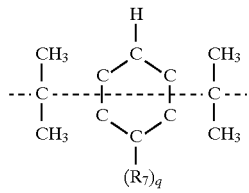

wherein:

q is 0 or 1; and $R_7$ has the above-indicated meaning; and when n is 3, $R_3$ is 1,2,4-triisopropylbenzene-α,α',α"-triyl; and for n is 1–4, $R_3$ can be a silicon-containing group.

5. The copolymer of claim 1 wherein X is an electron withdrawing group, optionally substituted with hydroxy, amino, epoxy or carboxy.

6. The copolymer of claim 1 wherein X is a group selected from the group consisting of alkoxycarbonyl, alkoxy, phenyl, substituted aromatic groups, aryloxycarbonyl, carboxy, acyloxy, aryloxy, epoxy, carbamoyl, halogen, halocarbon, carbonate sulfones, sulfoxides, phosphonates, phosphine oxide, hydroxy, amino, —$CONH_2$, —CON, cyano, and a group containing two or more of these functionalities which may be the same or different.

* * * * *